United States Patent
Flower et al.

(10) Patent No.: US 12,355,302 B2
(45) Date of Patent: Jul. 8, 2025

(54) METHOD FOR MANUFACTURING A ROTOR

(71) Applicant: SAFRAN ELECTRICAL & POWER, Blagnac (FR)

(72) Inventors: Paul David Flower, Buckinghamshire (GB); Adrian Uriondo, Bedfordshire (GB)

(73) Assignee: SAFRAN ELECTRICAL & POWER, Blagnac (FR)

(*) Notice: Subject to any disclaimer, the term of this patent is extended or adjusted under 35 U.S.C. 154(b) by 962 days.

(21) Appl. No.: 17/440,338

(22) PCT Filed: Mar. 18, 2020

(86) PCT No.: PCT/EP2020/057518
§ 371 (c)(1),
(2) Date: Sep. 17, 2021

(87) PCT Pub. No.: WO2020/188006
PCT Pub. Date: Sep. 24, 2020

(65) Prior Publication Data
US 2022/0190660 A1    Jun. 16, 2022

(30) Foreign Application Priority Data
Mar. 20, 2019 (GB) ....................... 1903828

(51) Int. Cl.
*H02K 15/03*    (2025.01)
*H02K 1/04*    (2006.01)
(Continued)

(52) U.S. Cl.
CPC .............. *H02K 1/04* (2013.01); *H02K 1/278* (2013.01); *H02K 1/28* (2013.01); *H02K 15/03* (2013.01); *H02K 15/12* (2013.01)

(58) Field of Classification Search
CPC ............ H02K 1/04; H02K 1/278; H02K 1/28; H02K 15/03; H02K 15/12; Y10T 29/49009; Y10T 29/29012
See application file for complete search history.

(56) References Cited

U.S. PATENT DOCUMENTS 4,170,505 A * 10/1979 Zgraggen ................. H02K 3/51
                                                                29/598
5,345,669 A    9/1994 Zigler et al.
(Continued)

FOREIGN PATENT DOCUMENTS

JP    09233775    9/1997

OTHER PUBLICATIONS

U.K. Search Report, Application No. GB1903828.0, dated Sep. 18, 2019, 4 pages.
(Continued)

*Primary Examiner* — Donghai D Nguyen
(74) *Attorney, Agent, or Firm* — RANKIN, HILL & CLARK LLP

(57) ABSTRACT

A method of manufacturing a rotor for a generator of an aircraft engine. The method includes providing a rotor body; mounting at least one magnet on the rotor body; wrapping a tow around the rotor body and the at least one magnet to form a wrapped tow having a plurality of layers overlaid in the radial direction; and curing the wrapped tow to form at least a part of a fibre-reinforced composite sleeve configured to retain the at least one magnet on the rotor body. The step of wrapping includes applying a controlled tension to the tow during wrapping. The controlled tension is varied according to the radial position of the layer being wrapped.

18 Claims, 5 Drawing Sheets

(51) Int. Cl.
    *H02K 1/278*     (2022.01)
    *H02K 1/28*     (2006.01)
    *H02K 15/12*     (2006.01)

(56) References Cited

U.S. PATENT DOCUMENTS

| | | |
|---|---|---|
| 9,130,437 B1 | 9/2015 | Pulnikov |
| 9,941,758 B2 * | 4/2018 | Geis ................ H02K 1/278 |
| 11,081,919 B2 * | 8/2021 | Andonian .............. H02K 1/278 |
| 2010/0019589 A1 | 1/2010 | Saban et al. |
| 2015/0076959 A1 | 3/2015 | Ehrhart et al. |
| 2015/0188369 A1 | 7/2015 | Arimatsu |
| 2018/0316246 A1 | 11/2018 | Andonian et al. |
| 2019/0081524 A1 | 3/2019 | Takano et al. |

OTHER PUBLICATIONS

Chinese Office Action, dated Aug. 26, 2023, 15 pages.
International Search Report dated Jul. 23, 2020, Application No. PCT/EP2020/057518, 3 pages.

* cited by examiner

METHOD FOR MANUFACTURING A ROTOR

TECHNICAL FIELD

The present invention relates to an improved method for manufacturing a rotor for a generator of an aircraft engine. The present invention also relates to a rotor for a generator of an aircraft engine manufactured according to such a method and to a generator of an aircraft engine and an aircraft propulsion unit comprising such a rotor.

BACKGROUND OF THE INVENTION

As will be understood by a person skilled in the design of generators, permanent magnet generators often include rotors with surface-mounted magnets, configured to induce electric fields in the windings of a corresponding stator. In high-speed electrical generators, the magnets can be exposed to extreme centripetal forces as they rotate. Factors such as the rotation speed of the rotor, the diameter of the rotor and the weight of the magnets can influence these centripetal forces. If the magnets are not held in place by some form of mechanical support, they can lift off from the rotor body, which can result in failure of the generator. There have been various solutions to attempt to retain the magnets on the rotor body.

One known solution involves pressing a pre-formed composite sleeve over the rotor body and magnets. U.S. Pat. No. 6,047,461A describes such a method, in which hydraulic pressure is used to fit a fibre-reinforced plastic sleeve over a permanent magnet assembly to secure it to the rotor shaft.

Another solution involves freezing the rotor body in a bath of liquid nitrogen, before sliding a sleeve over it and allowing the rotor to subsequently expand into the sleeve, trapping the magnets between the sleeve and the rotor body.

An alternative solution involves wrapping fibrous material which is pre-impregnated with a curable resin onto a rotor body under tension, and curing the resin to form a composite sleeve which retains the fibrous material in place. This curing step will however cause the fibrous material to relax, and as such provide a sleeve which is wound around the rotor body at a lower tension than that initially applied. In order to mitigate this relaxation, the pre-impregnated fibrous material is wrapped around the rotor body as tightly as possible, with the maximum possible tension applied constantly throughout the winding process.

A further solution is described in UK patent document GB2353902A, in which movement of the magnets is mitigated by providing depressions in the magnets, and using carbon fibre can portions to hold the magnets in place by an interference fit.

There is a need for an improved method for manufacturing rotors for permanent magnet generators. It is against this background that the invention has been devised.

SUMMARY OF THE INVENTION

According to a first aspect of the present invention, there is provided a method of manufacturing a rotor for a generator of an aircraft engine, the method comprising: providing a rotor body; mounting at least one magnet on the rotor body; wrapping a tow, comprising elongate fibres and a curable matrix, around the rotor body and the at least one magnet to form a wrapped tow having a plurality of layers of tow overlaid in the radial direction; and curing the wrapped tow to form at least a part of a fibre-reinforced composite sleeve configured to retain the at least one magnet on the rotor body, wherein the step of wrapping comprises applying a controlled tension to the tow during wrapping, and wherein the controlled tension is varied according to the radial position of the layer being wrapped.

The controlled tension may be varied during the wrapping step such that the controlled tension applied to at least one radially inner layer of the wrapped tow is higher than the controlled tension applied to at least one radially outer layer of the wrapped tow.

The controlled tension may be varied during the wrapping step such that the controlled tension is progressively reduced as the radial position of the layer being wrapped is increased. The term "progressively reduced" may involve gradually decreasing the tension. The term may additionally or alternatively involve one or more step change decreases. The tension may be progressively decreased so that it is different for each layer, or the same for each layer in a group of layers. For example, a first group of layers may be wound at a first controlled tension and a second group of layers wound at a second controlled tension which is less than the first controlled tension, where the second group of layers is radially outward of the first ground of layers. Further radially outer groups of layers may be wound at further controlled tensions which are less than the first and second controlled tensions. For example, a third group of layers which is radially outward of the second group of layers may be wound at a third controlled tension which is less than the second controlled tension.

The controlled tension applied to the tow during wrapping may be constant across the width of the tow. This means that for each layer or sublayer of tow, i.e. each bundle of tow, the controlled tension is constant across its width. In this manner, the tension applied to the fibres in each bundle is substantially constant. This differs from arrangements in which the tow is wrapped such that the fibres within each bundle have differing tensions.

When devising the present invention, the inventors identified various disadvantages of the known methods described in the "Background" section. Considering the solution which involves wrapping fibrous material which is pre-impregnated with a curable resin onto a rotor body under tension, and curing the resin to form a composite sleeve which retains the fibrous material in place, the inventors identified two main problems:

The first is magnet lift-off from the rotor surface due to a lower than expected compressive force applied by the sleeve to the magnets. This is detrimental to the electromagnetic performance of the generator with which the rotor is used.

The second is the possibility of unexpected failure of the outer layers of the sleeve during operation, leading to a reduction in the maximum operating speed of the rotor.

Without wishing to be bound by theory, the inventors believe that both problems are due to compression of the inner layers by the tightly-wound outer layers during the wrapping and curing of the sleeve which causes fibres in the inner layers to move radially inward, thereby reducing the pre-stress of the inner layers of the resulting cured sleeve. This reduced pre-stress lowers the compressive force applied by the sleeve to the magnets on the rotor, resulting in an increased risk of magnet lift-off from the rotor surface during operation. The reduced pre-stress in the inner layers can also lead to a reduction in the share of the overall retention force of the sleeve which is borne by the inner layers. This under-utilisation of the inner layers leads to an increase in loading on the outer layers, resulting in the possibility of failure of the outer layers and, shortly after, the entire sleeve.

By varying the controlled tension according to the radial position of the layer being wrapped, the resulting pre-stress in the cured sleeve of that layer can be fine-tuned to ensure more consistent working stress and safety factor through the sleeve thickness.

Varying the controlled tension during the wrapping step such that the controlled tension is reduced as the radial position of the layer being wrapped is increased can reduce the compression of the inner layers by the outer layers and thereby maintain a higher level of pre-stress in the inner layers than might be the case with constant controlled tension.

This can reduce the variation in stress and safety factor through the thickness of the sleeve, leading to more even utilisation of all of the layers of the sleeve and improved overall strength for a given amount of compression provided by the sleeve to the rotor.

Alternatively, or in addition, the controlled tension may be varied during the wrapping step such that the controlled tension applied to at least one radially innermost layer of the wrapped tow is lower than the controlled tension applied to at least one radially outer layer of the wrapped tow. This can be beneficial where the outer surface of the rotor is defined by stress concentrating features, such as a join between adjacent magnets or between a magnet and a spacer, which might otherwise cause a local stress increase on a tightly pre-stressed innermost layer. By reducing the controlled tension for the innermost layers, the resulting pre-stress of these layers is also reduced, allowing the stress concentration to be more readily absorbed by these layers and spread around the circumference of the sleeve.

The controlled tension may be varied during the wrapping step such that the controlled tension is progressively increased as the radial position of the layer being wrapped is increased.

The rotor body may be at least partly hollow. The rotor body may have a wall thickness to outer diameter ratio of greater than 1:3, preferably from 1:3 to 1:10, more preferably from 1:6 to 1:9, most preferably from 1:7 to 1:8.

The steps of wrapping and curing may be repeated at least once in sequence to form a fibre-reinforced composite sleeve comprising a plurality of concentric layers of fibre-reinforced composite. This allows the pre-stress in each concentric layer, or "stage", of the sleeve to be tuned independently of the other stages by varying the controlled tension of each stage as desired during wrapping. When curing pre-tensioned fibres, the fibres can move within the epoxy matrix. By carrying out the winding and curing process in multiple stages, the amount by which the fibres can move within each radially inner layer is reduced. This can also provide a sleeve having more consistent structural properties.

Preferably, each concentric layer is formed from a stage of wrapped and cured tow, with each stage comprising a plurality of layers of wrapped tow which is cured prior to wrapping of a subsequent outer stage.

Preferably, the fibre-reinforced composite sleeve comprises a first concentric layer formed from a first stage of wrapped and cured tow and a second concentric layer formed from second stage of wrapped and cured tow, wherein the second concentric layer is radially outward of the first concentric layer.

The step of wrapping may comprise varying the controlled tension applied during wrapping the layers of the first stage, such that the layers of the first stage are each wrapped at a different controlled tension. The step of wrapping may comprise varying the controlled tension applied during wrapping the layers of the second stage, such that the layers of the second stage are each wrapped at a different controlled tension.

The step of wrapping may comprise applying a first average controlled tension during wrapping of the layers of the first stage and applying a second average controlled tension during wrapping of the layers of the second stage, wherein the first average controlled tension is different to the second average controlled tension. Preferably, the first average controlled tension is greater than the second average controlled tension.

The step of wrapping may comprise applying a first controlled tension during wrapping of each layer of the first stage and applying a second controlled tension during wrapping of each layer of the second stage, wherein the first controlled tension is different to the second controlled tension.

The first controlled tension may be less than the second controlled tension.

The first controlled tension may be greater than the second controlled tension.

The fibre-reinforced composite sleeve may further comprise a third concentric layer formed from a third stage of wrapped and cured tow, wherein the third concentric layer is radially outward of the second concentric layer. In such embodiments, the step of wrapping may further comprise applying a third controlled tension during wrapping of each layer of the third stage, wherein the third controlled tension is different to each of the first and second controlled tensions. The third controlled tension may be less than the second controlled tension. The third controlled tension may be greater than the second controlled tension.

Where the fibre-reinforced composite sleeve further comprises a third concentric layer formed from a third stage of wrapped and cured tow, the step of wrapping may comprise applying a first average controlled tension during wrapping of the layers of the first stage, applying a second average controlled tension during wrapping of the layers of the second stage, and applying a third average controlled tension during wrapping of the layers of the third stage, wherein the third average controlled tension is different to each of the first and second average controlled tensions. Preferably, the third average controlled tension is less than the second average controlled tension. Preferably, the second average controlled tension is less than the first average controlled tension.

The fibre-reinforced composite sleeve may further comprise any number of additional concentric layers radially outward of the third concentric layer, each of which being formed from an additional stage of wrapped and cured tow which is wrapped at a different controlled tension which may be constant for each layer of that additional stage.

The at least one magnet may be a permanent magnet. The at least one magnet may be a plurality of magnets. The plurality of magnets may be arranged so that the rotor is substantially rotationally symmetrical. This has the advantage of providing more even loading of the sleeve during use.

The elongate fibres and the curable matrix may be provided as a pre-impregnated fibrous material. This has the advantage of providing a simplified method of manufacture. The elongate fibres may comprise carbon fibre such that the composite sleeve is a carbon-fibre reinforced composite sleeve. This has the advantage of providing a sleeve with improved mechanical and material properties.

According to a second aspect of the invention, there is provided a rotor for a generator of an aircraft engine manufactured according to the method of the first aspect.

According to a third aspect of the invention, there is provided a generator of an aircraft engine comprising the rotor of the second aspect.

According to a fourth aspect of the invention, there is provided an aircraft propulsion unit comprising the generator of the third aspect. The aircraft propulsion unit preferably further comprises an aircraft engine configured to drive the generator, for example via a rotating shaft.

BRIEF DESCRIPTION OF THE DRAWINGS

In the following detailed description, the invention will be described in more detail, by way of example only, with reference to the accompanying drawings, in which.

DETAILED DESCRIPTION

Figure 1:
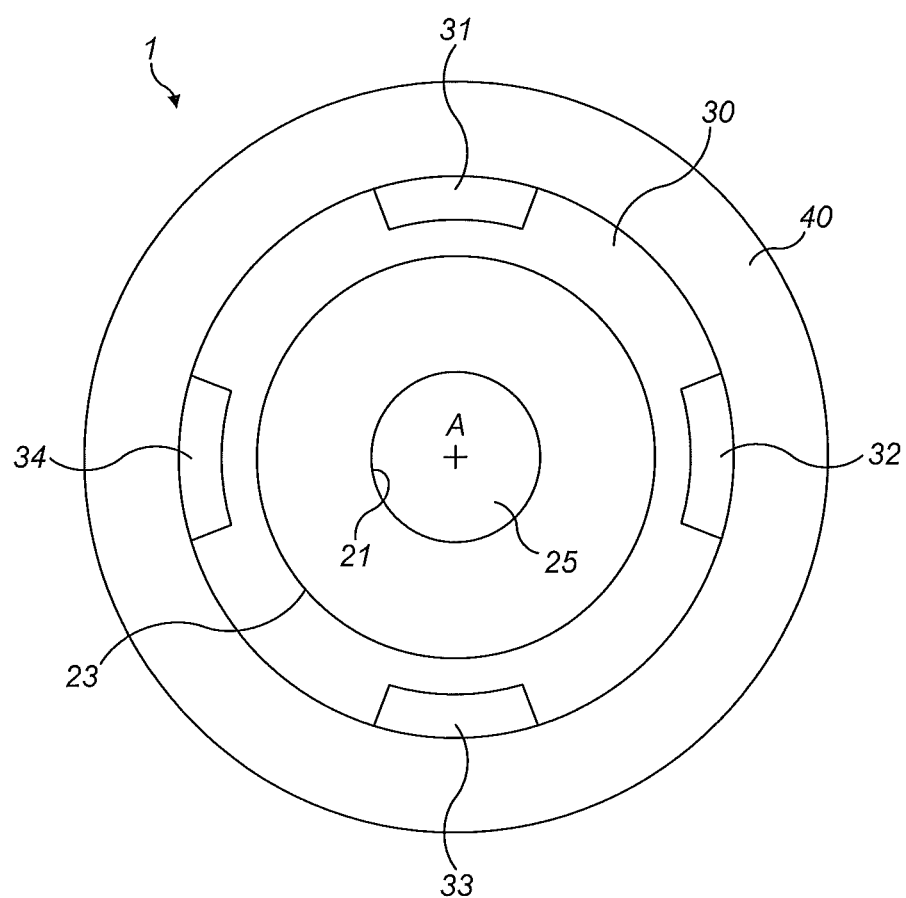
FIG. 1 shows a schematic cross-sectional illustration of a rotor.

FIG. 1 shows a rotor 1 which has been being manufactured according to an embodiment of the present invention. The rotor 1 may have mechanical properties, materials properties and/or one or more visual indications which are indicative of having been made by this method. The rotor 1 may also have a composite fibre arrangement and/or microstructure indicative of having been made by this method.

The illustration provided in FIG. 1 does not highlight the differences between the present invention and known methods. These differences will be explained in detail in relation to FIG. 5.

As shown in FIG. 1, the rotor 1 comprises a rotor body 20, a magnet layer 30, and a sleeve 40.

The rotor body 20 is configured to support at least one magnet, which may be provided in a magnet layer 30 as shown in FIG. 1. The rotor body 20 is configured to translate a driving force from a driving means to rotate the magnet layer 30, so as to generate a moving magnetic field. The rotor body 20 may be in the form of a rotor shaft, or may take any other suitable form. The rotor body 20 may be at least partly hollow, and may comprise an aperture 25 as shown in FIG. 1. The rotor body 20 may be thin-walled. The rotor body may have a wall which has an inner surface 21 and an outer surface 23. The wall has a thickness between its inner surface 21 and outer surface 23. The rotor body 20 may have a wall thickness to outer diameter ratio of up to from 1:3 to 1:10. In this example, the rotor body 20 has a wall thickness to outer diameter ratio of 1:7.7. The aperture 25 may be circular in cross-section. The aperture 25 may be provided centrally of the rotor body 20, such that the rotor body 20 is arranged with rotational symmetry about its central aperture. The rotor body 20 may be rotationally symmetrical about a central axis A.

The rotor 1 comprises at least one magnet, which may be a permanent magnet, i.e. a magnet which can retain its magnetic properties in the absence of an inducing field or current. The at least one magnet may be provided in a magnet layer 30 of the rotor, in which the at least one magnet is mounted on the rotor body 20, as shown in FIG. 1. The at least one magnet may be mounted directly (such that it or they are in direct contact with the rotor body 20), or indirectly (such that there is at least one other object between the at least one magnet and the rotor body 20) onto the rotor body 20. There may be provided at least two magnets. Advantageously, the at least one magnet is a plurality of magnets, and the plurality of magnets are arranged with rotational symmetry about the rotor body 20, specifically about axis A. This may result in the rotor itself being at least partly rotationally symmetrical. This may be facilitated by provision of an even number of magnets, arranged in pairs to each side of the axis of rotation A, and the magnets in each pair having substantially the same mass and/or shape as each other. In FIG. 1, the rotor is illustrated as having four magnets 31-34 which are arranged with rotational symmetry about axis A. The magnet layer 30 may comprise at least one spacer (not shown), provided as a filler around the at least one magnet 31-34, in the magnet layer 30. The magnet configuration and/or arrangement may be considered as a factor in the controlled tension applied to the tow. Specifically, the controlled tension applied to the tow preferably should be high enough to ensure that the magnets are in contact with the rotor both when the rotor is stationary and when the rotor is in use. Considering this factor, heavier magnets require a larger sleeve wall thickness and/or higher pre-stress applied during manufacture of the sleeve. Equally, the fibres should be strong enough not to burst during use of the rotor, specifically at maximum operating speed. The magnet configuration and/or arrangement may have a direct correlation with the level of and/or distribution of stress concentration within the inner layer of the sleeve. Preferably, the controlled tension applied to the tow includes a factor based on the level of stress concentration caused by the magnets, and/or the mass of the magnets.

The sleeve 40 extends around the rotor body 20 and the magnetic layer 30 and is configured to retain the at least one magnet 31-34 on the rotor body 20. The sleeve 40 may comprise a plurality of concentric layers of fibre-reinforced composite, as discussed below in relation to FIG. 2. Each layer of fibre-reinforced composite may have been made by repeating steps of wrapping and curing the tow at least once in sequence. Specifically, the layers of fibre-reinforced composite may have an appearance and/or a microstructure indicative of the layers being wrapped, then cured, then wrapped, then cured, and so on. Each wrapping step may comprise wrapping the tow around the rotor body 20 at least twice.

Figure 2:
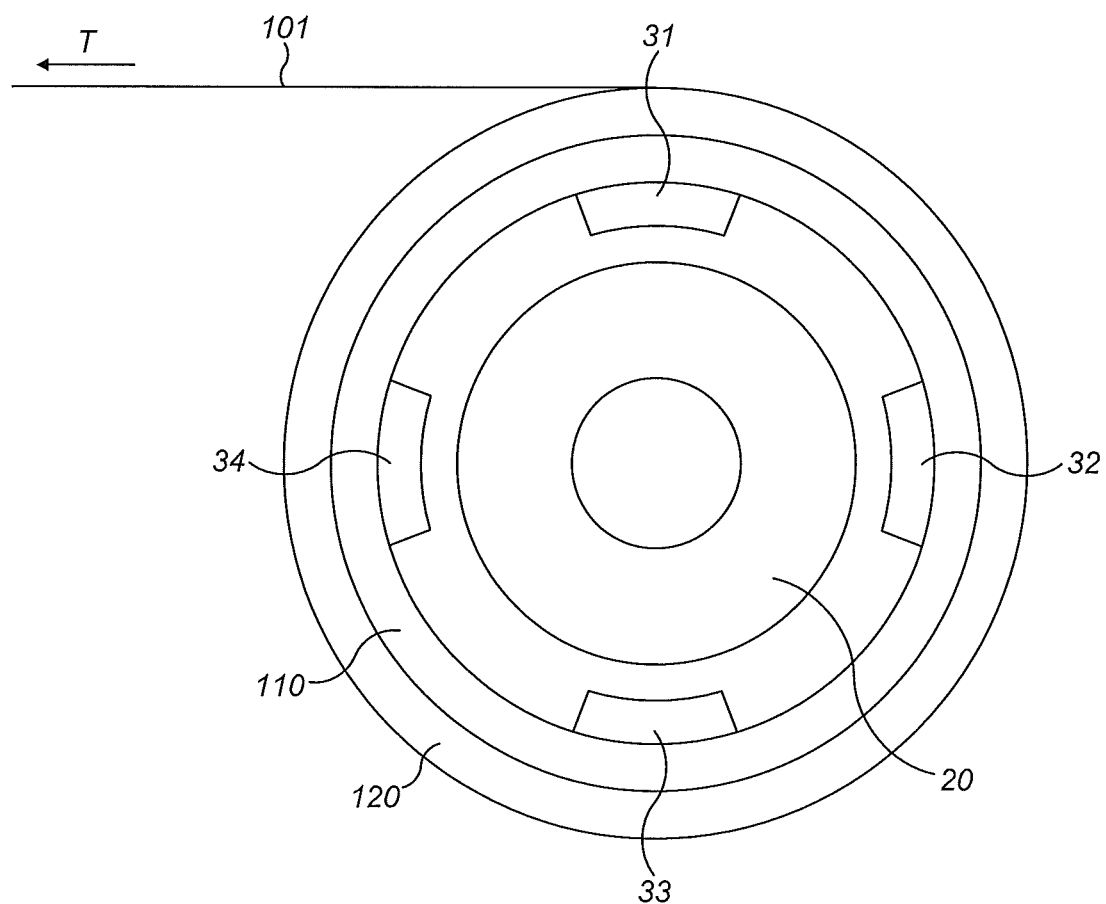
FIG. 2 shows a schematic cross-sectional illustration of a rotor during manufacture.

The sleeve 40 is in a partially-manufactured state in FIG. 2.

In relation to the method of manufacture, the sleeve 40 has a pre-cured state and a post-cured state. For ease of reference, the term "sleeve" is used herein to refer to the post-cured state, while the pre-cured state is described herein by reference to the wrapped tow of elongate fibres and curable bonding matrix from which the sleeve is formed. The sleeve in a post-cured state comprises a fibre-reinforced composite material formed by curing of the wrapped tow. The elongate fibres may be unidirectional. The elongate fibres may be non-woven. The elongate fibres may comprise carbon, and/or comprise carbon fibre material. The elongate fibres may comprise any other appropriate material such as carbon nanotubes and/or aramid fibres. The curable matrix may be a resin such as an epoxy, or any other appropriate material such as a curable polymeric material. The curable matrix may comprise one or more of: cyanate ester, benzoxazine resins and/or bismaleimides. The elongate fibres and the curable matrix may be provided as a pre-impregnated fibrous material.

With reference to FIG. 2, there is provided a method of manufacturing a rotor 1 for a generator of an aircraft engine. The method comprises:

providing a rotor body 20;

mounting at least one magnet 31-34, on the rotor body 20;

wrapping a tow 101, comprising elongate fibres and a curable matrix, around the rotor body 20 and the at least one magnet 31-34 to form a wrapped tow having a plurality of layers of tow 101 overlaid in the radial direction; and curing the wrapped tow to form at least part of a fibre-reinforced composite sleeve configured to retain the at least one magnet 31-34 on the rotor body 20, wherein the step of wrapping comprises applying a controlled tension T to the tow during wrapping, and wherein the controlled tension T is varied according to the radial position of the layer being wrapped.

The step of wrapping the tow 101 around the rotor body 20 is preferably carried out such that the fibres of the tow are not perpendicular to the rotor axis but are at a slight angle to the hoop direction, for example 90-95 percent in the hoop direction, or radial direction, and 5-10% in the axial direction. In this way, the fibres can still be overlaid in a radial direction, but may not be directly aligned from layer to layer in a circumferential direction. This can increase the bending strength of the sleeve. It can also reduce the risk of crack propagation between adjacent fibres as the sleeve expands during use.

As will be appreciated by a person skilled in the art, the term "radial position" means a position relative to a central axis of the rotor body 20. A person skilled in the art will appreciate that there is no requirement for the rotor body 20 to have a circular cross-section in order for a tow wrapped around the rotor body 20 to have a radial position. In a simple example considering a cylindrical rotor body 20, if a tow is wrapped around a rotor body 20 once to form an inner layer, then that part of the tow will have a given radial position. If the tow is then wrapped around the rotor body 20 a second time, such that it forms an outer layer, which is on top of or overlaid on the inner layer, then that outer layer is radially outwards of the inner layer. As a skilled person will appreciate, the outer layer has a different radial position to the inner layer.

A person skilled in the art will also appreciate that "at least part of a fibre-reinforced composite sleeve" includes both a whole and a part of a fibre-reinforced composite sleeve. The composite sleeve may comprise other component parts which are not manufactured by the present method, such as a reinforcing and/or functional layer. The composite sleeve may also be manufactured in parts, which in a simple example may be arranged side by side along a rotor shaft to form a composite sleeve. Equally the parts may be arranged in concentric layers around a rotor shaft.

The step of wrapping the tow 101 around the rotor body 20 may be performed in a plurality of stages. Curing the wrapped tow may performed between each stage. Specifically, the step of wrapping the tow around the rotor body 20 may performed in at least two stages, and curing the wrapped tow may performed between each stage. Equally, the step of wrapping the tow around the rotor body 20 may be performed in at least three stages, and curing the wrapped tow may be performed between each stage. For example, the tow may be wrapped around the rotor body 20 in a first stage. The tow may, for example, be wrapped multiple times around the rotor body 20 and the magnet layer 30 to form a first stage of wrapped tow comprising a plurality of overlaid layers of tow. Then, those wrapped layers may be cured to form a first cured layer 110. The tow may then be wound around the first cured layer 110 in a second wrapping stage to form a second stage of wrapped tow also comprising a plurality of overlaid layers of tow. Then, those wrapped layers of tow may be cured to form a second cured layer 120. This process may be continued to form further cured layers (not shown in FIG. 2).

The method of the present invention differs from known methods, in which a high (often the maximum possible) tension T is applied to the tow constantly throughout the winding process on the understanding that this will maximise the pre-stress and, therefore, the resistance by the sleeve to outward movement of the magnets. This has been found to have implications on the safety factor of the different layers in the sleeve, and of the sleeve as a whole, as discussed below in relation to FIGS. 3 and 4.

The parameter "safety factor" used herein is calculated as outlined in Equation 1.

$$SF = \frac{\sigma_{proof}}{\sigma_{working}} \qquad \text{Equation 1}$$

Where SF is the safety factor; $\sigma_{proof}$a is the stress at which the material undergoes 0.2% extension; and $\sigma_{working}$ is the stress to which the material tested is exposed in use. In the present case, the working stress is the stress to which the layer of sleeve is exposed at the maximum intended rotational speed of the rotor.

The inventors have identified that the ideal safety factor of each layer of the sleeve in the present application is a safety factor of 2. This has been found to provide sufficient margin between the working stress during use and the proof stress without excessive over-engineering of the sleeve to the detriment of other performance characteristics of the rotor. The inventors have also identified that the safety factor is not the same for each group of layers within the sleeve. When wrapping the tow of fibres, outer layers of the tow tend to compress inner layers of the tow. This can cause shifting the position of the fibres within those inner layers and compression of the rotor by the inner layers, reducing the resulting pre-stress in those layers. Therefore, within each cured group of layers there can be a variation in safety factor. It may also be due to differences in the working stress experienced in different parts of each layer during loading, for example due to the arrangement of the underlying rotor body and/or magnets. This variation in safety factors is illustrated in FIGS. 3 and 4, as discussed below.

Figure 3:
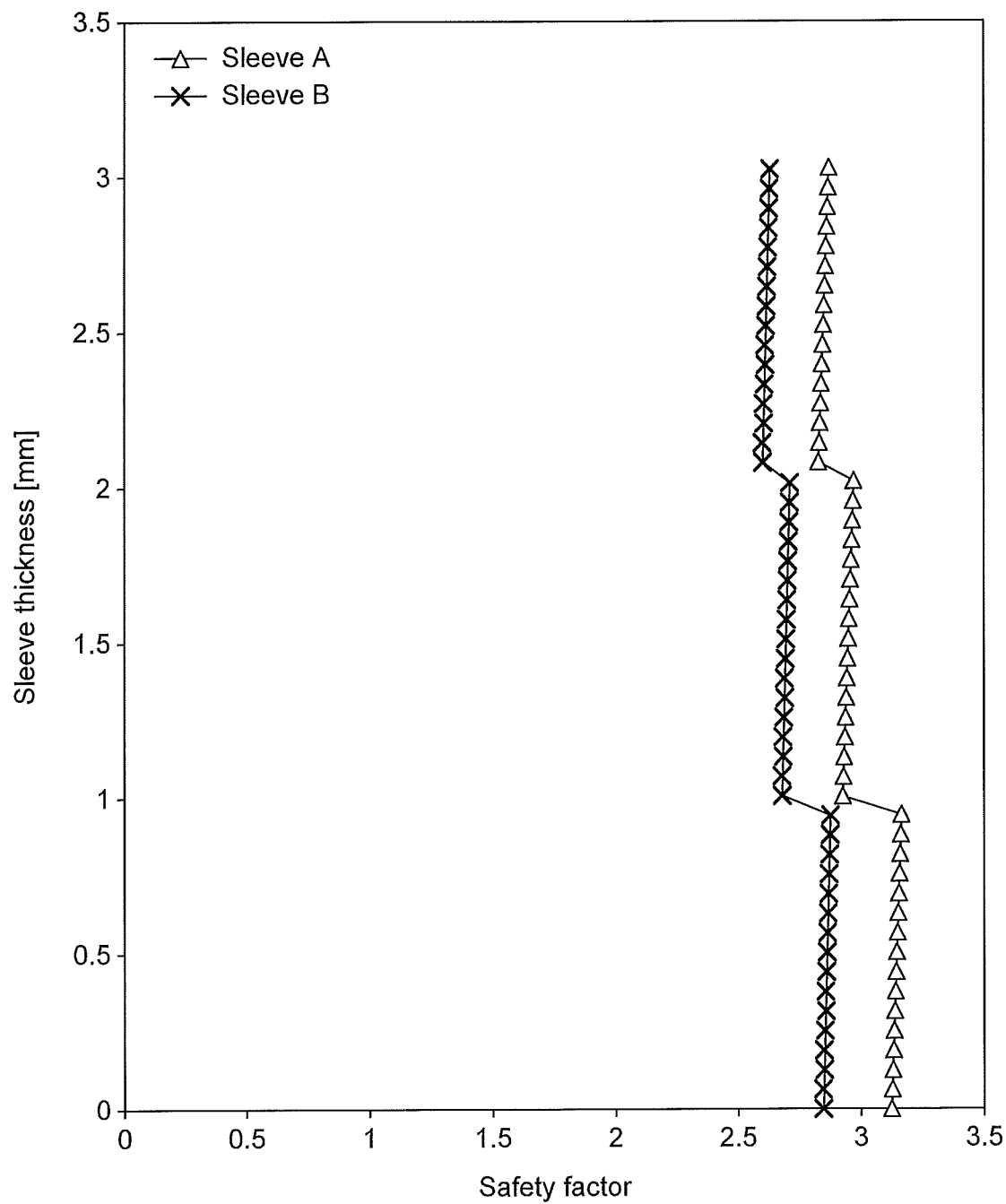
FIG. 3 is a comparison of safety factor values for two sleeves, manufactured by a known method in which tension is constant during wrapping of the tow.

FIG. 3 shows a comparison of safety factor values for the individual layers of two sleeves manufactured using a conventional process in which a constant tension is applied to the tow. Sleeve A has been manufactured using a constant tension of 670 MPa. Sleeve B has been manufactured using a constant tension of 730 MPa. Both sleeves a manufactured by wrapping the tow around the rotor body in three stages, each of which is formed from approximately 15-20 layers of overlaid tow and has a thickness of approximately 1 mm, with the sleeve being cured between each stage. In both sleeves, the safety factor of the layers within each stage increases in the radial direction but there is a step change decrease in safety factor between groups in a radially outward direction, i.e. from the inner group to the middle group and from the middle group to the outer group. This is due to differences in the extent to which the fibres in each stage can move slightly within the matrix during curing. The fibres of the innermost layers of each stage are laid directly onto a substrate and so cannot move radially inward during curing. Thus, the tension in these innermost layers is generally maintained. As more layers are added on top, the fibres within those layers can move during curing and the extent to which the fibres can move during curing increases as a function of the radial position of the layer within each stage. Because carbon fibre, or similar composite material, is so stiff, even a tiny movement can give a significant reduction in tension. Therefore the peak tension within each stager is on the innermost side and the tension decreases towards the outer layers of each stage. The resulting pre-stress in the cured sleeve is linked to the pre-tension in the uncured tow and so the pre-stress within each stage peaks at its innermost point and decreases slightly towards the outer layers. Higher pre-stress increases the overall stress during operation and so the decrease in pre-stress towards the outer layers of each stage leads to an increase in the safety factor towards the outer layers of each stage. Further, each stage is compressed by other stages which are added on top. This reduces the pre-stress in the inner stages while maintaining high pre-stress in the outer stages. Consequently, the average safety factor of the outer stage is less than that of the middle stage, which is less than that of the inner stage, as illustrated in FIG. 3 Thus, in both sleeves, the minimum safety factor occurs at the inner layer of the outer stage or group, at around the 2 mm point along the sleeve thickness. So in use failure will most likely start there before anywhere else, meaning that the inner layers with a higher safety factor will be under-utilised. This variation in safety factor in a given sleeve can mean that the maximum safe operational speed is unnecessarily limited.

Thus, it would be beneficial to ensure more even safety factor distribution throughout the thickness of the sleeve to promote more efficient use of all layers of the sleeve and thereby increase the maximum operational speed and/or improve the useful life of the sleeve.

Figure 4:
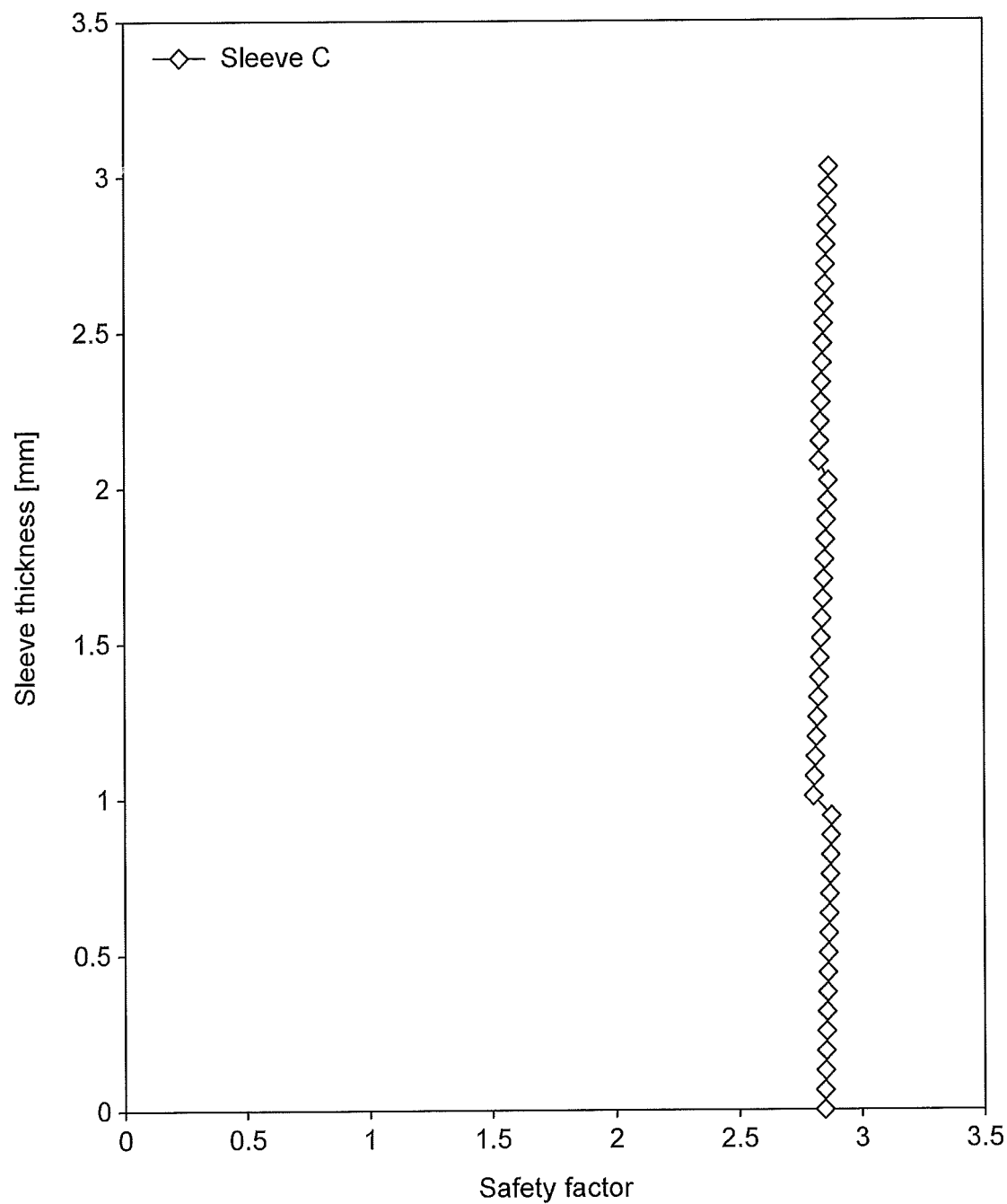
FIG. 4 is a graph showing the safety factor of each layer of a rotor sleeve manufactured according to an embodiment of the method of the present invention.

FIG. 4 is a graph showing the safety factor of each layer of a rotor sleeve manufactured according to an embodiment of the method of the present invention. As with the sleeves shown in FIG. 3, the sleeve illustrated as sleeve C in FIG. 4 is wrapped and cured in three distinct stages, each of which is formed from approximately 15-20 layers of overlaid tow and has a thickness of approximately 1 mm. However, unlike the earlier examples, the controlled tension T applied to the tow during the wrapping step is reduced for each subsequent group of layers, or "stage". In particular, the layers of the inner stage are wound onto the rotor body at a controlled tension of 730 MPa, the layers of the middle stage are wound onto the rotor body at a controlled tension of 700 MPa and the layers of the outer stage are wound onto the rotor body at a controlled tension of 670 MPa. As a result, the safety factors of the layers of each of the stages are more uniform once the sleeve has been cured. This means that the stresses within the sleeve during operation are more evenly distributed throughout the thickness of the sleeve, thus avoiding over-utilisation of the outer layers and under-utilisation of the inner layers relative to sleeves A and B illustrated in FIG. 3. This optimises the trade-off between pre-stress in the sleeve (thus preventing magnet lift-off) and sleeve strength (to prevent sleeve failure of "burst"), thereby facilitating an increase in sleeve performance. It also ensures that the values of safety factor all layers lie much closer to the ideal value than for the prior art rotor sleeves.

Varying the tension T according to the radial position of the layer being wrapped may take various different forms. In one embodiment, the controlled tension is varied during the wrapping step such that the controlled tension T applied to at least one radially inner layer of the wrapped tow is higher than the controlled tension applied to at least one radially outer layer of the wrapped tow. With reference to FIG. 2, the tension T applied to the tow (for example at point 103), may be decreased from the inner layers to the outer layers. Optionally, the controlled tension is varied during the wrapping step such that the controlled tension T is progressively reduced as the radial position of the layer being wrapped is increased. Specifically, the step of wrapping, comprising applying a controlled tension T to the tow, may be carried out such that the controlled tension T decreases from the inner radial position through all subsequent radial wrapping positions. In a simplified example, the tow may be wound around the rotor body 20 so as to form a plurality of layers, each layer having a different radial position relative to all other layers. In this example, the innermost layer is assembled at a controlled tension, $T_1$. The second layer, which is arranged directly on top of the innermost layer, is assembled at a controlled tension, $T_2$. The third layer, which is arranged directly on top of the second layer, is assembled at a controlled tension, $T_3$. In this example, for the step of wrapping in which a controlled tension is applied to the tow, to be carried out such that the controlled tension T decreases from the inner radial position through all subsequent radial wrapping positions. In such examples, the controlled tension T would need to be varied such that $T_1$ is greater than $T_2$ and $T_3$, and such that $T_2$ is greater than $T_3$.

In another embodiment, the controlled tension T may be varied during the wrapping step such that the controlled tension T applied to at least one radially inner layer of the wrapped tow is lower than the controlled tension T applied to at least one radially outer layer of the wrapped tow. The controlled tension may be varied during the wrapping step such that the controlled tension is progressively increased as the radial position of the layer being wrapped is increased.

The steps of the method may be performed as distinct steps, or may be performed at least partly simultaneously. In an advantageous embodiment, the steps of the method are performed in the order in which they are described herein.

Figure 5:
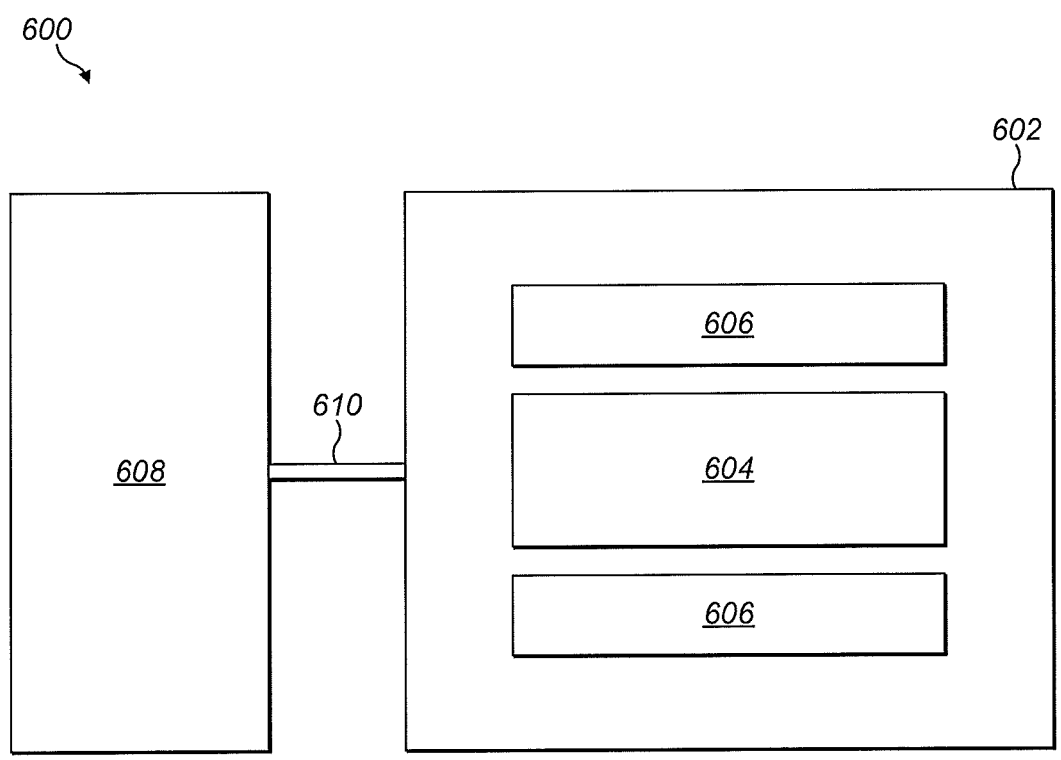
FIG. 5 is a schematic illustration of an aircraft engine comprising a generator including a rotor according to the present invention.

FIG. 5 illustrates an example of an aircraft propulsion unit 600 comprising a generator 602 and an aircraft engine 608. The generator 602 comprises a rotor 604 manufactured according to the present invention and a stator 606. The stator 606 comprises a magnetic stator core with a plurality of sets of windings that are wound around longitudinal slots in the stator core. The generator 602 is connected to the aircraft engine 608 by means of a rotating shaft 610, wherein the engine 608 drives the shaft 610 to thereby drive the generator 602 by causing rotation of the rotor 604 to generate an electrical current.

In the context of a hybrid aircraft, the generator described herein may be used in a propulsive system, wherein the generator is driven by a turboshaft to thereby give propulsive power to the aircraft to feed the electric motors driving the propellers of the aircraft.

Various modifications, whether by way of addition, deletion and/or substitution, may be made to all of the above described embodiments to provide further embodiments, any and/or all of which are intended to be encompassed by the appended claims.

The invention may also be defined in accordance with the following clauses:

1. A method of manufacturing a rotor for a generator of an aircraft engine, the method comprising:
    providing a rotor body;
    mounting at least one magnet on the rotor body;
    wrapping a tow, comprising elongate fibres and a curable matrix, around the rotor body and the at least one magnet to form a wrapped tow having a plurality of layers of tow overlaid in the radial direction; and
    curing the wrapped tow to form at least a part of a fibre-reinforced composite sleeve configured to retain the at least one magnet on the rotor body,
    wherein the step of wrapping comprises applying a controlled tension to the tow during wrapping, and wherein the controlled tension is varied according to the radial position of the layer being wrapped such that the controlled tension applied to at least one radially inner layer of the wrapped tow is higher than the controlled tension applied to at least one radially outer layer of the wrapped tow.
2. A method according to clause 1, wherein the controlled tension is varied during the wrapping step such that the controlled tension is progressively reduced as the radial position of the layer being wrapped is increased.
3. A method according to clause 1, wherein the controlled tension applied to the tow during wrapping is constant across the width of the tow.
4. A method according to any of the preceding clauses, wherein the rotor body is at least partly hollow.
5. A method according to clause 4, wherein the rotor body has a wall thickness to outer diameter ratio of from 1:3 to 1:10, preferably from 1:6 to 1:9, more preferably from 1:7 to 1:8.
6. A method according to any of the preceding clauses, wherein the steps of wrapping and curing are repeated at least once in sequence to form a fibre-reinforced composite sleeve comprising a plurality of concentric layers of fibre-reinforced composite.
7. A method according to clause 6, wherein each concentric layer is formed from a stage of wrapped and cured tow, with each stage comprising a plurality of layers of wrapped tow which is cured prior to wrapping of a subsequent outer stage.
8. A method according to clause 7, wherein the fibre-reinforced composite sleeve comprises a first concentric layer formed from a first stage of wrapped and cured tow and a second concentric layer formed from second stage of wrapped and cured tow.
9. A method according to clause 8, wherein the step of wrapping comprises applying a first controlled tension during wrapping of each layer of the first stage and applying a second controlled tension during wrapping of each layer of the second stage, wherein the first controlled tension is different to the second controlled tension.
10. A method according to clause 9, wherein the first controlled tension is greater than the second controlled tension.
11. A method according to any of the preceding clauses, wherein the at least one magnet is a permanent magnet.
12. A method according to any of the preceding clauses, wherein the at least one magnet is a plurality of magnets, and wherein the plurality of magnets are arranged so that the rotor is substantially rotationally symmetrical.
13. A method according to any of the preceding clauses, wherein the elongate fibres and the curable matrix are provided as a pre-impregnated fibrous material.
14. A method according to any of the preceding clauses, wherein the elongate fibres comprise carbon fibre such that the composite sleeve is a carbon-fibre reinforced composite sleeve.
15. A rotor for a generator of an aircraft engine, the rotor being manufactured according to the method of any of the preceding clauses.
16. A generator of an aircraft engine comprising a rotor according to clause 15.
17. An aircraft propulsion system comprising a generator according to clause 16.

The invention claimed is:

1. A method of manufacturing a rotor for a generator of an aircraft engine, the method comprising:
    providing a rotor body;
    mounting at least one magnet on the rotor body;
    wrapping a tow, comprising elongate fibres and a curable matrix, around the rotor body and the at least one magnet to form a wrapped tow having a plurality of layers of the tow overlaid in a radial direction; and
    curing the wrapped tow to form at least a part of a fibre-reinforced composite sleeve configured to retain the at least one magnet on the rotor body,
    wherein the step of wrapping comprises applying a controlled tension to the tow during wrapping, and wherein the controlled tension is varied according to a radial position of the layer being wrapped such that the controlled tension applied to at least one radially inner layer of the wrapped tow is higher than the controlled tension applied to at least one radially outer layer of the wrapped tow;
    wherein the steps of wrapping and curing are performed as discrete steps and are repeated at least once in sequence to form a fibre-reinforced composite sleeve comprising a plurality of concentric layers of fibre-reinforced composite.
2. The method according to claim 1, wherein the controlled tension is varied during the wrapping step such that the controlled tension is progressively reduced as the radial position of the layer being wrapped is increased.
3. The method according to claim 1, wherein the controlled tension applied to the tow during wrapping is constant across a width of the tow.
4. The method according to claim 1, wherein the rotor body is at least partly hollow.
5. The method according to claim 4, wherein the rotor body has a wall thickness to outer diameter ratio of from 1:3 to 1:10.
6. The method according to claim 4, wherein the rotor body has a wall thickness to outer diameter ratio of 1:6 to 1:9.
7. The method according to claim 4, wherein the rotor body has a wall thickness to outer diameter ratio of from 1:7 to 1:8.
8. The method according to claim 1, wherein each concentric layer is formed from a stage of wrapped and cured tow, with each stage comprising a plurality of layers of wrapped tow which is cured prior to wrapping of a subsequent outer stage.
9. The method according to claim 8, wherein the fibre-reinforced composite sleeve comprises a first concentric layer formed from a first stage of wrapped and cured tow and a second concentric layer formed from second stage of wrapped and cured tow.

10. The method according to claim 9, wherein the step of wrapping comprises applying a first controlled tension during wrapping of each layer of the first stage and applying a second controlled tension during wrapping of each layer of the second stage, wherein the first controlled tension is different to the second controlled tension.

11. The method according to claim 10, wherein the first controlled tension is greater than the second controlled tension.

12. The method according to claim 1, wherein the at least one magnet is a permanent magnet.

13. The method according to claim 1, wherein the at least one magnet is a plurality of magnets, and wherein the plurality of magnets are arranged so that the rotor is substantially rotationally symmetrical.

14. The method according to claim 1, wherein the elongate fibres and the curable matrix are provided as a pre-impregnated fibrous material.

15. The method according to claim 1, wherein the elongate fibres comprise carbon fibre such that the composite sleeve is a carbon-fibre reinforced composite sleeve.

16. A rotor for a generator of an aircraft engine, the rotor being manufactured according to the method of claim 1.

17. A generator of an aircraft engine comprising a rotor according to claim 16.

18. An aircraft propulsion system comprising a generator according to claim 17.

* * * * *